US012605909B2

(12) United States Patent
Grebe et al.

(10) Patent No.: US 12,605,909 B2
(45) Date of Patent: Apr. 21, 2026

(54) PROCESS FOR THE SURFACE TREATMENT OF POLYMERIC THREE-DIMENSIONAL OBJECTS

(71) Applicant: Evonik Operations GmbH, Essen (DE)

(72) Inventors: Maik Grebe, Bochum (DE); Wolfgang Diekmann, Waltrop (DE); Andreas Domingues Baptista, Duesseldorf (DE)

(73) Assignee: Evonik Operations GmbH, Essen (DE)

( * ) Notice: Subject to any disclaimer, the term of this patent is extended or adjusted under 35 U.S.C. 154(b) by 419 days.

(21) Appl. No.: 17/432,184

(22) PCT Filed: Feb. 17, 2020

(86) PCT No.: PCT/EP2020/054105
§ 371 (c)(1),
(2) Date: Aug. 19, 2021

(87) PCT Pub. No.: WO2020/169532
PCT Pub. Date: Aug. 27, 2020

(65) Prior Publication Data
US 2022/0184905 A1     Jun. 16, 2022

(30) Foreign Application Priority Data
Feb. 21, 2019    (EP) ..................................... 19158560

(51) Int. Cl.
*B29C 64/30*       (2017.01)
*B29C 71/00*       (2006.01)
(Continued)

(52) U.S. Cl.
CPC .......... *B29C 71/0009* (2013.01); *B29C 64/30* (2017.08); *B29C 71/02* (2013.01);
(Continued)

(58) Field of Classification Search
CPC .............. B29C 2071/027; B29C 71/02; B29C 71/0009; B33Y 40/20
See application file for complete search history.

(56) References Cited

U.S. PATENT DOCUMENTS 5,121,329 A    6/1992   Crump
5,234,636 A   *   8/1993   Hull ....................... B33Y 10/00
                                        427/508
(Continued)

FOREIGN PATENT DOCUMENTS

DE         19747309       4/1999
DE    10 2009 047 237       8/2011
(Continued)

OTHER PUBLICATIONS

Plastim, Material Safety Data Sheet for Nylon 12, 2019, available at https://plastim.co.uk/wp-content/uploads/2019/07/Nylon-12-Safety-Data-Sheet.pdf and retrieved on Nov. 20, 2023. (Year: 2019).*
(Continued)

*Primary Examiner* — Xiao S Zhao
*Assistant Examiner* — Nicholas J Chidiac
(74) *Attorney, Agent, or Firm* — Grüneberg Global IP, PLLC

(57) ABSTRACT
A process can be used for the surface treatment of three-dimensional objects which have been produced in additive manufacturing processes from at least one polymer. The process involves a) immersing the three-dimensional object in a substance mixture A, b) leaving the three-dimensional object in the substance mixture A for a time, and c) removing the three-dimensional object from the substance mixture A. The process then involves d) immersing the three-dimensional object in a substance mixture B, e) leaving the three-dimensional object in the substance mixture B for a time, and f) removing the three-dimensional object from the substance mixture B. The substance mixture A has a tem-
(Continued)

perature (process temperature A) which is above the melting point of the polymer, and the substance mixture B has a temperature (process temperature B) which is below the melting point of the polymer.

9 Claims, 1 Drawing Sheet

(51) Int. Cl.
   *B29C 71/02*          (2006.01)
   *B33Y 40/20*          (2020.01)
(52) U.S. Cl.
   CPC ........ *B33Y 40/20* (2020.01); *B29C 2071/027*
              (2013.01); *B29K 2995/0073* (2013.01)

(56)                References Cited

U.S. PATENT DOCUMENTS

| | | | |
|---|---|---|---|
| 5,932,687 A | 8/1999 | Baumann et al. | |
| 6,136,948 A | 10/2000 | Dickens, Jr. et al. | |
| 6,243,616 B1 | 6/2001 | Droscher et al. | |
| 6,245,281 B1 | 6/2001 | Scholten et al. | |
| 6,531,086 B1 | 3/2003 | Larsson | |
| 7,114,943 B1 | 10/2006 | Fong et al. | |
| 7,135,525 B2 | 11/2006 | Petter et al. | |
| 7,148,286 B2 | 12/2006 | Baumann et al. | |
| 7,211,615 B2 | 5/2007 | Baumann et al. | |
| 7,317,044 B2 | 1/2008 | Monsheimer et al. | |
| 7,491,792 B2 | 2/2009 | Monsheimer et al. | |
| 7,708,929 B2 | 5/2010 | Monsheimer et al. | |
| 7,794,647 B1 | 9/2010 | Deckard | |
| 7,795,339 B2 | 9/2010 | Monsheimer et al. | |
| 7,887,740 B2 | 2/2011 | Simon et al. | |
| 7,906,063 B2 | 3/2011 | Monsheimer et al. | |
| 7,988,906 B2 | 8/2011 | Monsheimer et al. | |
| 8,066,933 B2 | 11/2011 | Monsheimer et al. | |
| 8,119,715 B2 | 2/2012 | Monsheimer et al. | |
| 8,173,258 B2 | 5/2012 | Monsheimer et al. | |
| 8,232,333 B2 | 7/2012 | Haeger et al. | |
| 8,449,809 B2 | 5/2013 | Monsheimer et al. | |
| 8,591,797 B2 | 11/2013 | Monsheimer et al. | |
| 8,834,777 B2 | 9/2014 | Simon et al. | |
| 8,840,829 B2 | 9/2014 | Monsheimer et al. | |
| 8,865,053 B2 | 10/2014 | Monsheimer et al. | |
| 9,114,567 B2 | 8/2015 | Monsheimer et al. | |
| 9,144,941 B2 | 9/2015 | Grebe et al. | |
| 9,162,392 B2 | 10/2015 | Grebe et al. | |
| 9,238,310 B2 | 1/2016 | Grebe et al. | |
| 9,272,446 B2 | 3/2016 | Grebe et al. | |
| 9,382,420 B2 | 7/2016 | Diekmann et al. | |
| 9,428,610 B2 | 8/2016 | Diekmann et al. | |
| 9,643,359 B2 | 5/2017 | Baumann et al. | |
| 9,718,218 B2 | 8/2017 | Mikulak et al. | |
| 9,908,262 B2 | 3/2018 | Mikulak et al. | |
| 10,005,885 B2 | 6/2018 | Monsheimer et al. | |
| 10,118,222 B2 | 11/2018 | Monsheimer et al. | |
| 10,307,935 B2 | 6/2019 | Devaraj et al. | |
| 10,343,303 B2 | 7/2019 | Mikulak et al. | |
| 10,356,849 B2 | 7/2019 | Grebe et al. | |
| 10,406,745 B2 | 9/2019 | Baumann et al. | |
| 10,479,733 B2 | 11/2019 | Diekmann et al. | |
| 10,596,728 B2 | 3/2020 | Diekmann et al. | |
| 10,632,730 B2 | 4/2020 | Grebe et al. | |
| 10,787,559 B2 | 9/2020 | Monsheimer et al. | |
| 10,968,314 B2 | 4/2021 | Diekmann et al. | |
| 11,117,837 B2 | 9/2021 | Diekmann et al. | |
| 11,179,904 B2* | 11/2021 | Barnes ................. | B29C 64/393 |
| 11,186,688 B2 | 11/2021 | Diekmann et al. | |
| 11,254,030 B2 | 2/2022 | Diekmann et al. | |
| 11,285,662 B2 | 3/2022 | Grebe et al. | |
| 11,407,147 B1* | 8/2022 | Kaiser .................... | B29C 35/02 |
| 2004/0102539 A1 | 5/2004 | Monsheimer et al. | |
| 2004/0106691 A1 | 6/2004 | Monsheimer et al. | |
| 2004/0130060 A1 | 7/2004 | Hammer et al. | |
| 2004/0137228 A1 | 7/2004 | Monsheimer et al. | |
| 2004/0138363 A1 | 7/2004 | Baumann et al. | |
| 2004/0180980 A1 | 9/2004 | Petter et al. | |
| 2004/0204531 A1 | 10/2004 | Baumann et al. | |
| 2004/0232583 A1 | 11/2004 | Monsheimer et al. | |
| 2005/0027047 A1 | 2/2005 | Monsheimer et al. | |
| 2005/0027050 A1 | 2/2005 | Monsheimer et al. | |
| 2005/0173838 A1 | 8/2005 | Priedeman, Jr. et al. | |
| 2006/0071359 A1 | 4/2006 | Monsheimer et al. | |
| 2006/0134419 A1 | 6/2006 | Monsheimer et al. | |
| 2006/0189784 A1 | 8/2006 | Monsheimer et al. | |
| 2006/0202395 A1 | 9/2006 | Monsheimer et al. | |
| 2006/0223928 A1 | 10/2006 | Monsheimer et al. | |
| 2006/0244169 A1 | 11/2006 | Monsheimer et al. | |
| 2007/0013108 A1 | 1/2007 | Monsheimer et al. | |
| 2007/0126159 A1 | 6/2007 | Simon et al. | |
| 2007/0182070 A1 | 8/2007 | Monsheimer et al. | |
| 2007/0183918 A1 | 8/2007 | Monsheimer et al. | |
| 2007/0197692 A1 | 8/2007 | Monsheimer et al. | |
| 2007/0232753 A1 | 10/2007 | Monsheimer et al. | |
| 2007/0238056 A1 | 10/2007 | Baumann et al. | |
| 2008/0116616 A1 | 5/2008 | Monsheimer et al. | |
| 2008/0166496 A1 | 7/2008 | Monsheimer et al. | |
| 2008/0249237 A1 | 10/2008 | Hager et al. | |
| 2008/0258346 A1 | 10/2008 | Simon et al. | |
| 2008/0300353 A1 | 12/2008 | Monsheimer et al. | |
| 2009/0088508 A1 | 4/2009 | Monsheimer et al. | |
| 2009/0236775 A1 | 9/2009 | Monsheimer et al. | |
| 2010/0320649 A1 | 12/2010 | Niebling | |
| 2010/0324190 A1 | 12/2010 | Monsheimer et al. | |
| 2011/0118410 A1 | 5/2011 | Simon et al. | |
| 2011/0130515 A1 | 6/2011 | Monsheimer et al. | |
| 2011/0237756 A1 | 9/2011 | Monsheimer et al. | |
| 2011/0252618 A1 | 10/2011 | Diekmann et al. | |
| 2012/0041132 A1 | 2/2012 | Monsheimer et al. | |
| 2012/0202012 A1 | 8/2012 | Grebe et al. | |
| 2012/0264877 A1 | 10/2012 | Häger et al. | |
| 2012/0315483 A1 | 12/2012 | Baumann et al. | |
| 2013/0011660 A1 | 1/2013 | Diekmann et al. | |
| 2013/0012643 A1 | 1/2013 | Monsheimer et al. | |
| 2013/0075957 A1 | 3/2013 | Swanson et al. | |
| 2013/0101803 A1 | 4/2013 | Grebe et al. | |
| 2013/0171416 A1 | 7/2013 | Diekmann et al. | |
| 2013/0177766 A1 | 7/2013 | Grebe et al. | |
| 2013/0177767 A1 | 7/2013 | Grebe et al. | |
| 2013/0183493 A1 | 7/2013 | Grebe et al. | |
| 2013/0183494 A1 | 7/2013 | Grebe et al. | |
| 2013/0183529 A1 | 7/2013 | Diekmann et al. | |
| 2013/0216836 A1 | 8/2013 | Grebe et al. | |
| 2013/0274435 A1 | 10/2013 | Diekmann et al. | |
| 2013/0316145 A1 | 11/2013 | Diekmann et al. | |
| 2014/0079916 A1 | 3/2014 | Grebe et al. | |
| 2014/0371364 A1 | 12/2014 | Monsheimer et al. | |
| 2015/0251247 A1 | 9/2015 | Monsheimer et al. | |
| 2015/0336292 A1 | 11/2015 | Mikulak et al. | |
| 2016/0167304 A1 | 6/2016 | Diekmann et al. | |
| 2016/0278899 A1* | 9/2016 | Heller ................. | A61K 31/198 |
| 2017/0151724 A1 | 6/2017 | Ender et al. | |
| 2017/0165912 A1 | 6/2017 | Diekmann et al. | |
| 2017/0165913 A1 | 6/2017 | Diekmann et al. | |
| 2017/0274591 A1 | 9/2017 | Grebe et al. | |
| 2017/0305036 A1 | 10/2017 | Mikulak et al. | |
| 2017/0327658 A1 | 11/2017 | Moreau et al. | |
| 2018/0036938 A1 | 2/2018 | Baumann et al. | |
| 2018/0093925 A1 | 4/2018 | Diekmann et al. | |
| 2018/0094103 A1 | 4/2018 | Diekmann et al. | |
| 2018/0098384 A1 | 4/2018 | Grebe et al. | |
| 2018/0186034 A1 | 7/2018 | Mikulak et al. | |
| 2018/0281232 A1 | 10/2018 | Devaraj et al. | |
| 2018/0355123 A1 | 12/2018 | Diekmann et al. | |
| 2019/0240869 A1 | 8/2019 | Devaraj et al. | |
| 2019/0275702 A1 | 9/2019 | Mikulak et al. | |
| 2019/0275731 A1 | 9/2019 | Baumann et al. | |
| 2020/0156287 A1 | 5/2020 | Diekmann et al. | |
| 2020/0230937 A1 | 7/2020 | Grebe et al. | |
| 2020/0307085 A1 | 10/2020 | Grebe et al. | |
| 2021/0276288 A1* | 9/2021 | Barnes ................. | B29C 64/165 |

(56) References Cited

U.S. PATENT DOCUMENTS

| | | | |
|---|---|---|---|
| 2021/0371346 A1 | 12/2021 | Diekmann et al. | |
| 2022/0055007 A1* | 2/2022 | Mitra .................. | A61K 9/0095 |
| 2022/0098372 A1 | 3/2022 | Diekmann et al. | |

FOREIGN PATENT DOCUMENTS

| | | |
|---|---|---|
| EP | 1 419 870 | 5/2004 |
| EP | 1740367 | 11/2009 |
| EP | 3305510 | 4/2018 |
| GB | 791135 | 2/1958 |
| JP | 2017-100407 | 6/2017 |
| WO | 96/06881 | 3/1996 |
| WO | 2005/082979 | 9/2005 |
| WO | 2015/124639 | 8/2015 |
| WO | 2015/141776 | 9/2015 |

OTHER PUBLICATIONS

Aktar T, Adal E. Determining the Arrhenius Kinetics of Avocado Oil: Oxidative Stability under Rancimat Test Conditions. Foods. Jun. 30, 2019;8(7):236. doi: 10.3390/foods8070236. PMID: 31261986; PMCID: PMC6679119. (Year: 2019).*

National Center for Biotechnology Information (2024). PubChem Compound Summary for CID 753, Glycerin. Retrieved Nov. 7, 2024 from https://pubchem.ncbi.nlm.nih.gov/compound/Glycerin (Year: 2024).*

International Search Report issued May 4, 2020 in PCT/EP2020/054105 with English translation, 7 pages.

Written Opinion issued May 4, 2020 in PCT/EP2020/054105 with English translation, 10 pages.

U.S. Appl. No. 10/665,472, filed Sep. 22, 2003, 2004/0137228, Monsheimer et al.

U.S. Appl. No. 11/332,270, filed Jan. 17, 2006, 2006/0244169, Monsheimer et al.

U.S. Appl. No. 10/637,613, filed Aug. 11, 2003, 2004/0102539, Monsheimer et al.

U.S. Appl. No. 10/637,637, filed Aug. 11, 2003, 2004/0106691, Monsheimer et al.

U.S. Appl. No. 12/131,425, filed Jun. 2, 2008, 2008/0300353, Monsheimer et al.

U.S. Appl. No. 10/901,204, filed Jul. 29, 2004, 2005/0027050, Monsheimer et al.

U.S. Appl. No. 10/565,779, filed Jan. 25, 2006, 2006/0223928, Monsheimer et al.

U.S. Appl. No. 13/024,629, filed Feb. 10, 2011, 2011/0130515, Monsheimer et al.

U.S. Appl. No. 11/293,360, filed Dec. 5, 2005, 2006/0134419, Monsheimer et al.

U.S. Appl. No. 13/494,082, filed Jun. 12, 2012, 2012/0264877, Häger et al.

U.S. Appl. No. 13/156,577, filed Jun. 9, 2011, 2011/0237756, Monsheimer et al.

U.S. Appl. No. 11/387,673, filed Mar. 23, 2006, Carl Deckard.

U.S. Appl. No. 11/671,820, filed Feb. 6, 2007, 2007/0182070, Monsheimer et al.

U.S. Appl. No. 11/694,129, filed Mar. 30, 2007, 2007/0232753, Monsheimer et al.

U.S. Appl. No. 13/012,283, filed Jan. 24, 2011, 2011/0118410, Simon et al.

U.S. Appl. No. 12/528,456, filed Oct. 1, 2009, 2010/0320649, Frank Niebling.

U.S. Appl. No. 13/086,860, filed Apr. 14, 2011, 2011/0252618, Diekmann et al.

U.S. Appl. No. 13/581,085, filed Aug. 24, 2012, 2012/0315483, Baumann et al.

U.S. Appl. No. 16/422,345, filed May 24, 2019, 2019/0275731, Baumann et al.

U.S. Appl. No. 13/552,891, filed Jul. 19, 2012, 2013/0183494, Grebe et al.

U.S. Appl. No. 13/722,159, filed Dec. 20, 2012, 2013/0177766, Grebe et al.

U.S. Appl. No. 13/733,465, filed Jan. 3, 2013, 2013/0177767, Grebe et al.

U.S. Appl. No. 13/859,896, filed Apr. 10, 2013, 2013/0274435, Diekmann et al.

U.S. Appl. No. 13/889,568, filed May 8, 2013, 2013/0316145, Diekmann et al.

U.S. Appl. No. 15/051,757, filed Feb. 24, 2016, 2016/0167304, Diekmann et al.

U.S. Appl. No. 14/029,153, filed Sep. 17, 2013, 2014/0079916, Grebe et al.

U.S. Appl. No. 61/610,605, filed Mar. 14, 2012, Mikulak et al.

U.S. Appl. No. 16/421,612, filed May 24, 2019, 2019/0275702, Mikulak et al.

U.S. Appl. No. 17/510,697, filed Oct. 26, 2021, 2022/0098372, Diekmann et al.

U.S. Appl. No. 62/271,116, filed Dec. 22, 2015, Devaraj et al.

U.S. Appl. No. 16/385,863, filed Apr. 16, 2019, 2019/0240869, Devaraj et al.

U.S. Appl. No. 15/733,258, filed Jun. 18, 2020, 2020/0307085, Grebe et al.

U.S. Appl. No. 17/399,281, filed Aug. 11, 2021, 2021/0371346, Diekmann et al.

U.S. Appl. No. 15/718,069, filed Sep. 28, 2017, 2018/0094103, Diekmann et al.

Chinese Office Action dated Oct. 21, 2022, in Chinese Application No. 202080021687.0, with English translation, 16 pages.

* cited by examiner

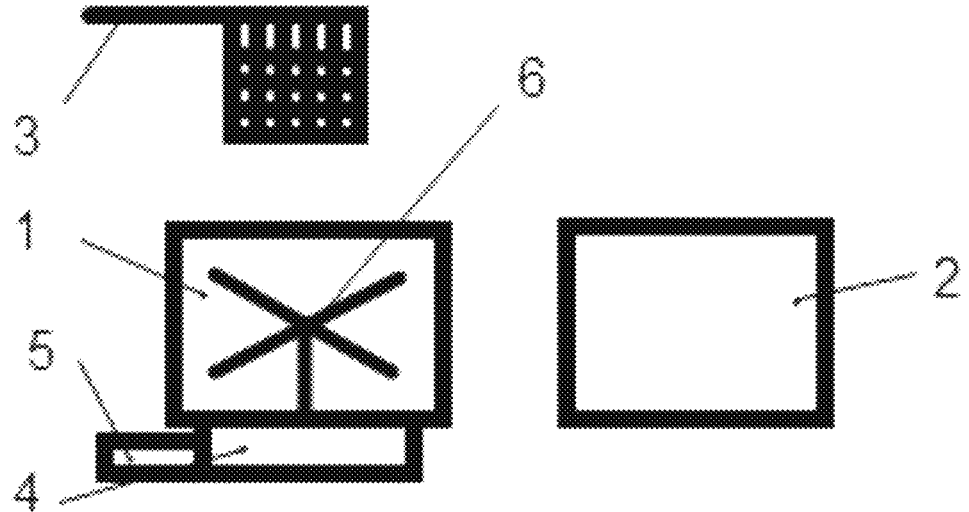

PROCESS FOR THE SURFACE TREATMENT OF POLYMERIC THREE-DIMENSIONAL OBJECTS

CROSS-REFERENCE TO RELATED APPLICATIONS

This application is the National Stage entry under § 371 of International Application No. PCT/EP2020/054105, filed on Feb. 17, 2020, and which claims the benefit of priority to European Application No. 19158560.3, filed on Feb. 21, 2019. The content of each of these applications is hereby incorporated by reference in its entirety.

BACKGROUND OF THE INVENTION

Field of the Invention

The present invention relates to the surface treatment of three-dimensional objects which have been produced in additive manufacturing processes from at least one polymer. The invention also relates to an apparatus for the surface treatment and also to shaped bodies which have been treated by the process.

Description of Related Art

The rapid provision of prototypes or small batches is a problem that has frequently been encountered in recent times. Methods that enable the rapid production of three-dimensional objects are called rapid prototyping, rapid manufacturing, additive fabrication methods or 3D printing. In ISO/ASTM 52900 these methods are subsumed under the term additive manufacturing.

Methods in which a strand is deposited in layers in order to produce a three-dimensional object are subsumed under the term material extrusion. One example of material extrusion is fused deposition modelling (FDM). This method is described in detail in U.S. Pat. No. 5,121,329.

Particularly suitable methods are those in which the desired structures are produced layer by layer, by selective melting and/or consolidation of pulverulent materials. The methods that work according to this principle are summarized using the umbrella term "powder bed fusion". Powder bed fusion technology encompasses, among other techniques, selective heat sintering (SHS), selective laser sintering (SLS), selective absorbing sintering (SAS) and selective inhibition sintering (SIS). Laser sintering is described in detail in the documents U.S. Pat. No. 8,138,948 and WO 9606881. Further examples of powder bed fusion methods are mentioned in patent specifications U.S. Pat. No. 6,531,086 and EP 1740367 (US 2007/238058). DE 19747309 (U.S. Pat. No. 6,245,281) discloses a powder of good suitability for use in the powder bed fusion method.

One disadvantage with the methods mentioned above is that the objects produced with these methods do not exhibit a uniform, smooth surface. In many application cases, a smooth surface of the objects is desirable or even necessary for aesthetic or technical reasons, meaning that objects produced by means of the abovementioned methods cannot be used.

There are various surface treatment methods for making the surfaces smoother (i.e. with a lower roughness). An established, simple mechanical method for surface treatment is blasting with blasting materials such as for example sand or glass spheres. However, the surfaces are only insufficiently smoothed by this method. A further mechanical method is vibratory finishing or barrel finishing. Smooth surfaces can be achieved with this method, but inside corners are poorly finished and exposed corners are excessively finished. There is also the risk with this method that delicate components are damaged.

In US 2005/0173838, the surfaces of a three-dimensional object are smoothed by means of a vaporous solvent. Although smoothing is achieved at al points on a three-dimensional object, a solvent which dissolves the polymer material is required. However, solvents which dissolve the most commonly used polymers are corrosive or at least hazardous to health and the environment. In the case of organic vapours, there is also a high risk of explosion.

US 2017/327658 A1 describes a process for surface treatment. Here, an object is placed in concentrated acid and subsequently heated.

DE 102009047237 A1 describes an apparatus for dissolving away support material in three-dimensionally printed models. This apparatus comprises a plurality of basins in order to enable the flushing of the model.

SUMMARY OF THE INVENTION

It was therefore an object of the present invention to provide a simple and cost-effective surface treatment process which smooths the surfaces of a three-dimensional object, that is to say reduces the roughness of the surface. The smoothed surface should be as uniform as possible. The process should in this case not require toxic or health-endangering substances. The elongation at break of the objects should moreover be increased.

Surprisingly, the object has been achieved by a process in which the surface of a three-dimensional object which has been produced in additive manufacturing processes from at least one polymer is processed. The process according to the invention comprises the steps of:

- a) immersing the three-dimensional object in a substance mixture A,
- b) leaving the three-dimensional object in the substance mixture A for a time,
- c) removing the three-dimensional object from the substance mixture A,
- d) immersing the three-dimensional object in a substance mixture B,
- e) leaving the three-dimensional object in the substance mixture B for a time and
- f) removing the three-dimensional object from the substance mixture B.

The substance mixture A has a temperature which is above the melting point of the polymer. This temperature is called process temperature A. The substance mixture B has a temperature which is below the melting point of the polymer. This corresponds to process temperature B. If two or more polymers were used in the production of a three-dimensional object, the conditions above and also those below apply to the mixture of polymers, unless otherwise stated.

BRIEF DESCRIPTION OF THE DRAWING

The FIGURE shows an apparatus with which the surface of a three-dimensional object is smoothed by the process according to the invention.

DETAILED DESCRIPTION OF THE INVENTION

The process according to the invention makes it possible to provide shaped bodies having a lower roughness, that is to say increased and uniform surface smoothness. The shaped bodies also display an increased elongation at break.

The object from the additive manufacturing process is produced layer by layer in accordance with the standard.

In this application, the substance mixture also encompasses the special case where the substance mixture A or B consists of a single substance.

In a preferred embodiment of the process, the temperature of the three-dimensional object is adjusted prior to step a) to a temperature of below 0° C. Particular preference is given to a temperature adjustment to below −20° C., particularly preferably to below −40° C. The cooling conditions should be selected such that it is ensured that the entire three-dimensional object exhibits the desired temperature.

Preferred substances for substance mixture A have a molecular mass of at least 150 g/mol. Examples of such compounds are selected from alkanes, arenes, alcohols, including polyhydric alcohols such as glycols, siloxanes, sulfoxides and alkenes.

The substance mixture A preferably contains at least 50 mass %, based on the total mass of substance mixture A, of a substance which is liquid at process temperature A. Preferably, at least 70 mass % of liquid substances are present, particularly preferably at least 90 mass %. The remaining portions of the substance mixture are in solid form at the process temperature A.

The substances of substance mixture A which are liquid at process temperature A may be miscible with one another (formation of a single homogeneous phase) or else immiscible with one another (formation of a plurality of phases).

Preferably, the at least one liquid substance of the substance mixture A is immiscible with any further liquid components of the substance mixture A that are present. In this case, the one liquid substance should have a good compatibility with the polymer material of the three-dimensional object, that is to say the difference in surface tension between polymer and liquid substance is at most 10 mN/m, preferably at most 5 mN/m. The at least one liquid substance very particularly preferably corresponds to the polymer or polymer mixture of the three-dimensional object.

The further liquid components are preferably selected such that they dissolve the polymeric material of the three-dimensional object poorly, if at all, according to the CRC Handbook of Chemistry and Physics, 94th Edition (i.e. the solubility of the polymer is less than 10 g/l at 23° C.).

As a measure of the compatibility between liquid substance and the polymer of the three-dimensional object, the difference in the respective surface tension can be used (measured according to the pendant drop method, determined by means of the OCA 20 surface tension measuring instrument from Data Physics at process temperature A of the process according to the invention).

The at least one liquid substance may contain additives which bring about one or more additional effects on the surface of the three-dimensional object, such as for example colour/colour effects, electrical conductivity, hardness, flame retardancy, chemicals/weathering stability, friction properties or tactile properties.

The process is conducted in the order a to f, where the process steps a to c and/or d to f can be conducted more than once. As a result, a plurality of layers of liquid substance of substance mixture can be applied or the surface can be treated multiple times. In addition, the object can be immersed in different substance mixtures A, so that layers each having different properties can be applied to the three-dimensional object.

In a preferred embodiment of the process, no heating of the surface of the shaped body above 120° C. is effected after application of substance mixture A. It is likewise preferable for no heating of the surface of the shaped body above 120° C. to be effected after application of substance mixture B. Particularly preferably, no heating of the surface is effected after application of the substance mixtures. Alternatively, the surface may be cooled.

The temperature of the substance mixture A is selected depending on the polymer of the three-dimensional object. For materials having more than one melting point, the main melting point is decisive for the temperature of substance mixture A. The main melting point is the highest peak in the DSC curve, that is to say the temperature at which the highest amount of energy is needed to increase the temperature further.

In the process according to the invention, a temperature which is above the melting point of the polymer is selected for the substance mixture A. Preferably, the temperature of substance mixture A is at least 10° C. above the melting point of the polymer, particularly preferably at least 20° C. and very particularly preferably at least 30° C. above the melting point of the polymer.

The boiling point of substance mixture A should in this case by preference be at least 20° C. above the melting point of the polymer, preferably at least 30° C. and very particularly preferably at least 40° C.

Preference is given to selecting a substance mixture A the density of which differs by not more than 25% from the density of the polymer of the three-dimensional object (density in each case at 23° C.). Particular preference is given to selecting a substance mixture A the density of which differs by not more than 15% and very particularly preferably not more than 5%.

In the process according to the invention, the three-dimensional object is by preference immersed for most 60 s in the substance mixture A and B, respectively, preferably for at most 40 s, particularly preferably for at most 20 s and very particularly preferably for at most 10 s. Should the steps be conducted more than once, the indications of time in each case relate to the individual steps being repeated. The period of time between the removal from A and the immersion in B should be as short as possible. The period of time is for example 1 s to 30 s, preferably 2 s to 10 s.

In the process according to the invention, a temperature which is below the melting point of the three-dimensional object is selected for the substance mixture B. Preferably, the temperature of substance mixture B is at least 20° C. below the melting point of the three-dimensional object, particularly preferably at least 40° C. and very particularly preferably at least 80° C. below the melting point of the three-dimensional object.

It is preferable for substance mixture B to be liquid at the process temperature B.

Preference is given to selecting a substance mixture B in which the individual components of the mixture of the polymeric material of the three-dimensional object dissolve poorly, if at all, according to the CRC Handbook of Chemistry and Physics, 94th Edition (i.e. the solubility of the polymer is less than 10 g/l at 23° C.). The components should be chemically inert with respect to the polymer. In addition, they should have a relatively high specific heat capacity, that is to say they should have a specific heat capacity of at least 2 kJ/(kg·K), preferably at least 3 kJ/(kg·K) and preferably at least 4 kJ/(kg·K). Suitable substance mixtures B are for example oils or water, with water being preferred.

Treatment with the substance mixtures A and B results in a shaped body which preferably has a pH-neutral surface. Those skilled in the art will select substance mixtures A and B accordingly in this respect. In this case, substance mixture B should ideally be neutral or (in the case of an acidic substance mixture A) alkaline or (in the case of an alkaline substance mixture B) acidic.

All reported melting/boiling temperatures relate to values at standard pressure which have been measured by means of DSC (DIN 53765. DSC 7 from Perkin Elmer, heating/cooling rate 20 K/min).

Suitable polymers for the production of three-dimensional objects are for example selected from polyamides, polyaryl ether ketones such as polyether ether ketone, polyolefins such as polyethylene or polypropylene, polyesteramides, polylactides and acrylonitile-butadiene-styrene copolymers. Polyamides are preferred. Examples of preferred polyamides are nylon-11, nylon-12 or nylon-6,13.

The invention further provides an apparatus with which the surface of a three-dimensional object is smoothed by the process according to the invention. The apparatus is illustrated in the FIGURE. The apparatus comprises at least a receptacle A (1) which is suitable for accommodating the substance mixture A and a receptacle B (2) which is suitable for accommodating the substance mixture B. A further part of the apparatus is a heating device (4) which can heat the substance mixture in receptacle A (1). The apparatus preferably has a controller (5) in order to be able to adjust the temperature of the receptacle A (1). The receptacle A (1) preferably has a stirring apparatus (6) for the introduction of shear into a substance mixture. An optional part of the apparatus according to the invention is a lattice container (3) with which the three-dimensional objects can be immersed into the respective liquids in the receptacle A (1) and receptacle B (2) and removed again.

The apparatus is designed in a continuous variant. In this variant, the three-dimensional objects are passed by means of a conveyor belt into receptacle A and from there into receptacle B.

The Invention further provides shaped bodies from an additive manufacturing process which are obtained from processes according to the invention. In one embodiment of the invention, the surface of the shaped body is not heated above 120° C. after application of substance mixture A and/or substance mixture B. In a further embodiment, the shaped body has a pH-neutral surface. The shaped body preferably contains polymers selected from polyamides, polyaryl ether ketones such as polyether ether ketone, polyolefins such as polyethylene or polypropylene, polyesteramides, polylactides, acrylonitrile-butadiene-styrene copolymers and mixtures thereof. Polyamides are preferred. Examples of preferred polyamides are nylon-11, nylon-12 or nylon-6,13.

EXAMPLES

Example 1: SLS Component PA12 Sandblasted (not According to the Invention)

A test specimen produced by means of SLS (in accordance with DIN EN ISO 527-1 and UL94) from nylon-12 (EOSINT PA2200) is freed from powder residues by means of glass bead blasting.

Example 2: SLS Component PEA Sandblasted (not According to the Invention)

A test specimen produced by means of SLS (in accordance with DIN EN ISO 527-1 and UL94) from polyesteramide PEA (EOSINT Primepart ST) is freed from powder residues by means of glass bead blasting.

Example 3: SLS Component PA613 Sandblasted (not According to the Invention)

A test specimen produced by means of SLS (in accordance with DIN EN ISO 527-1 and UL94) from PA613 precipitated powder is freed from powder residues by means of glass bead blasting.

Example 4: FDM Component Untreated (not According to the Invention)

A test specimen produced by means of FDM (in accordance with DIN EN ISO 527-1 and UL94) from acrylonitrile-butadiene-styrene ABS is freed from the support geometries and washed.

Example 5: FDM Component Untreated (not According to the Invention)

A test specimen produced by means of FDM (in accordance with DIN EN ISO 527-1 and UL94) from polylactide PLA is freed from the support geometries and washed.

Example 6: SLS Component PA12 Surface-Treated at 200° C. (According to the Invention)

A test specimen produced and processed further as in example 1 is additionally immersed in an oil bath (MARLOTHERM N) at 205° C. for 20 s. Then, the test specimen is removed and immersed in a water bath (25° C.) for 10 s.

Example 7: SLS Component Surface-Treated at 170° C. (According to the Invention)

A test specimen produced and processed further as in example 2 is additionally immersed in a glycerol bath at 170° C. for 20 s. Then, the test specimen is removed and immersed in a water bath (25° C.) for 10 s.

Example 8: SLS Component Surface-Treated at 230° C. (According to the Invention)

A test specimen produced and processed further as in example 3 is additionally immersed in an oil bath (MARLOTHERM N) at 240° C. for 20 s. Then, the test specimen is removed and immersed in a water bath (25° C.) for 10 s.

Example 9: FDM Component Surface-Treated at 120° C. (According to the Invention)

A test specimen produced and processed further as in example 4 is additionally immersed in a bath of propane-1, 2-diol at 150° C. for 20 s. Then, the test specimen is removed and immersed in a water bath (25° C.) for 10 s.

Example 10: FDM Component Surface-Treated at 160° C. (According to the Invention)

A test specimen produced and processed further as in example 5 is additionally immersed in an ethylene glycol oil bath at 180° C. for 20 s. Then, the test specimen is removed and immersed in a water bath (25° C.) for 10 s.

Example 11: SLS Component PA12 Surface-Treated at 200° C. (According to the Invention)

A test specimen produced and processed further as in example 1 is adjusted to a temperature of −30° C. in a cooling chamber for 4 h. Then, the test specimen is additionally immersed in a substance mixture at 200° C. for 20 s. The substance mixture consists of 80 percent by mass of a heat transfer oil (MARLOTHERM N) and 20% of a nylon-12 (VESTAMID L1723 blk sw). The substance mixture is constantly mixed using a stirrer. Then, the test specimen is removed and immersed in a water bath (25° C.) for 10 s.

Example 12: SLS Component PA12 Surface-Treated at 190° C. (According to the Invention)

A test specimen/UL test specimen produced and processed further as in example 1 is adjusted to a temperature of −60° C. in a cooling chamber for 16 h. Then, the tensile test specimen/UL test specimen is additionally immersed in a substance mixture at 190° C. for 40 s. The substance mixture consists of 80 percent by mass of a heat transfer oil (MARLOTHERM N) and 20% of a nylon-12 (VESTAMID X7166 nc). The substance mixture is constantly mixed using a stirrer. Then, the test specimen is removed and immersed in a water bath (25° C.) for 10 s.

Tabelle 1: Results of the test specimen tests

| Example | Modulus of elasticity [MPa] | Tensile strength [MPa] | Elongation at break [%] | Roughness Sa [μm] | Comment |
|---|---|---|---|---|---|
| 1 | 1750 | 49 | 18 | 42 | Component white, UL94 3.2 mm HB |
| 2 | 183 | 9 | 216 | 63 | |
| 3 | 2242 | 58 | 26 | 44 | |
| 4 | 2136 | 56 | 3 | 382 | |
| 5 | 3127 | 51 | 5 | 128 | |
| 6* | 1714 | 48 | 57 | 22 | |
| 7* | 184 | 10 | 384 | 28 | |
| 8* | 2231 | 59 | 64 | 24 | |
| 9* | 2120 | 55 | 5 | 298 | |
| 10* | 3133 | 52 | 5 | 92 | |
| 11* | 1713 | 48 | 42 | 16 | Component black |
| 12* | 1694 | 47 | 33 | 15 | UL94 3.2 mm V2 |

*according to the invention

The test specimens were tested according to DIN EN ISO 527-1 and UL94. The arithmetic mean height (Sa) was used as a measure of the roughness. The Sa was determined on the underside of the test specimen using a Keyence VHX6000 microscope. The results of the illustrative tests can be found in table 1. It can be seen that the roughness of the three-dimensional objects was markedly reduced by the process according to the invention. The elongation at break of the three-dimensional objects in the examples according to the invention was markedly increased, while the other mechanical characteristics were maintained at the same level. In addition, in example 11 a black surface was achieved. In example 12 a flame-retardant effect was achieved.

A reduced surface roughness of the three-dimensional objects could thus be achieved with the process according to the invention. Furthermore, additional effects such as colour or flame-retardancy could also be achieved by the process according to the invention.

The invention claimed is:

1. A process for surface treatment of a three-dimensional object which has been produced in an additive manufacturing processes from at least one polymer, the process comprising:
   a) immersing the three-dimensional object in a substance mixture A,
   b) leaving the three-dimensional object in the substance mixture A for a time,
   c) removing the three-dimensional object from the substance mixture A,
   d) immersing the three-dimensional object in a substance mixture B,
   e) leaving the three-dimensional object in the substance mixture B for a time, and
   f) removing the three-dimensional object from the substance mixture B,
   wherein the substance mixture A has a temperature (process temperature A) which is above a melting point of the at least one polymer and wherein a liquid component of mixture A is at least one substance selected from the group consisting of an alkane, an arene, an alcohol, a siloxane, a sulfoxide and an alkene, and wherein the substance mixture B has a temperature (process temperature B) which is below the melting point of the at least one polymer;
   a surface tension difference between a surface tension of a liquid component of substance mixture A and a surface tension of said at least one polymer of the three-dimensional object is at most 10 mN/m,
   the substance mixture A contains at least 50 mass %, based on a total mass of substance mixture A, of at least one substance which is liquid at process temperature A, and
   the at least one substance which is liquid at process temperature A is immiscible with further liquid components of the substance mixture A.

2. The process according to claim 1, wherein a density of the substance mixture A differs by not more than 25% from a density of the at least one polymer of the three-dimensional object.

3. The process according to claim 1, wherein a surface tension of said at least one substance which is liquid at process temperature A corresponds to a surface tension of said at least one polymer of the three-dimensional object.

4. The process according to claim 1, wherein a) to f) are conducted more than once.

5. The process according to claim 1, wherein a temperature of the three-dimensional object is adjusted prior to a) to a temperature of below 0° C.

6. The process according to claim 1, wherein the substance mixture B has a temperature which is at least 20° C. below the melting point of the at least one polymer.

7. The process according to claim 1, wherein the substance mixture B is liquid at the process temperature B.

8. The process according to claim 1, wherein the substance mixture B contains substances in which the at least one polymer has a solubility of less than 10 g/l.

9. The process according to claim 1, wherein said at least one polymer is at least one polymer selected from the group consisting of a polyamide, a polyaryl ether ketone, a polyolefin, a polyesteramide, a polylactide, an acrylonitrile-butadiene-styrene copolymer, and a mixture thereof.

* * * * *